March 31, 1970     A. G. FOX     3,504,299
OPTICAL MASER MODE SELECTOR
Filed June 23, 1965
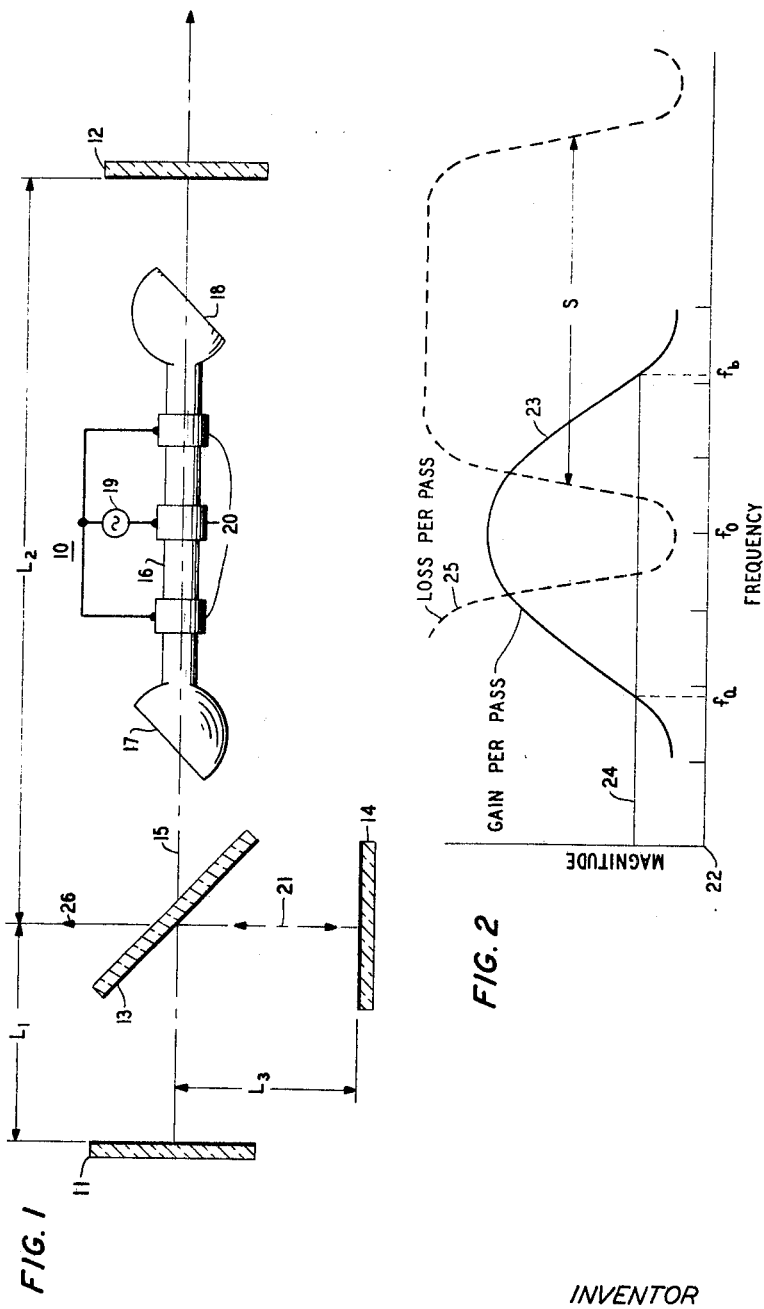
INVENTOR
A. G. FOX
BY
*Kenneth W. Mateer*
ATTORNEY

3,504,299
OPTICAL MASER MODE SELECTOR

Arthur G. Fox, Rumson, N.J., assignor to Bell Telephone Laboratories, Incorporated, New York, N.Y., a corporation of New York
Filed June 23, 1965, Ser. No. 466,365
Int. Cl. H01s 1/00; 3/05
U.S. Cl. 331—94.5                 3 Claims

ABSTRACT OF THE DISCLOSURE

In the optical maser disclosed, mode selection is achieved through use of primary and secondary resonators coupled in a non-collinear arrangement by an oblique beam splitter. The secondary resonator includes end reflectors disposed with respect to the beam splitter to exclude the active medium from the secondary resonator. The secondary resonator can then be made arbitrarily small with a correspondingly high axial-mode-frequency spacing and discrimination against all but one axial mode of the primary resonator.

---

This invention relates to optical masers and, more particularly, to cavity resonators for use in such devices.

The invention of the optical maser has made possible the generation and amplification of coherent electromagnetic waves in the optical frequency range. This range is generally considered to extend from the farthest infrared portion of the spectrum through the ultraviolet. Due to the extremely high frequencies associated with wave energy in this light range, the coherent waves produced by optical maser devices are capable of transmitting enormous quantities of information. Thus, the resulting extension of the usable portion of the electromagnetic spectrum has greatly increased the number of frequency channels available for communication and other uses.

An important element of an optical maser, at least when employed in the oscillatory mode, is an optical cavity resonator tuned to the frequency of the stimulated emission. The design of resonators at microwave frequencies is a relatively simple matter, typical structures having dimensions of the order of a single wavelength at the chosen frequency. The application of this design approach to optical masers, or lasers, as they are now generally called, is impractical, however, due to the extremely small wavelengths involved. It has been necessary, therefore, to design optical cavity resonators having dimensions which are thousands of times larger than the wavelength of signals at the operating frequency.

One such structure which has been employed successfully for the specified purpose is the Fabry-Perot interferometer comprising two plane parallel reflective surfaces separated by a gap of convenient length. The active medium of the laser is located in the gap between the reflective surfaces, at least one of which is partially transmissive to permit coupling the device to an external utilization circuit. An optical maser of this type is described in United States Patent 2,929,922 to Schawlow and Townes.

Optical cavity resonators, being of necessity much larger than the wavelengths employed therewith, are inherently multimode devices. A mathematical analysis of the mode system in a Fabry-Perot resonator having reflecting end surfaces can be found in an article by Fox and Li in the Bell System Technical Journal, volume 40, page 453, in which it is shown that the resonator may be excited in a number of characteristic modes which differ from one another in the number of field variations both along the axis joining the end surfaces and in planes transverse to the axis. All modes having the same transverse distribution of fields but which differ only in the number of axial variations have the same diffraction loss. These "longitudinal resonances" will occur at frequencies for which there are an integral number of half wavelength variations between the reflectors. Consequently if the negative temperature medium provides gain over a sufficient frequency range, a number of these longitudinal resonances, or modes, may be simultaneously excited even though only the lowest order transverse mode is permitted.

The presence of many modes in a laser adapted for communication purposes, however, is disadvantageous. For example, significantly more power is required by a multimode than a single mode laser device to produce the desired well defined output line which stands out clearly from the background emission. Furthermore, the excitation of many modes has an adverse effect on the stability of the laser, on the modulation process, and on the demodulation process, all important considerations in communications systems.

An object of this invention is an optical maser cavity resonator having a mode system which includes relatively few preferred modes among a plurality of resonant modes.

It is also an object of this invention to increase the losses of certain modes in the cavity resonator of an optical maser, relative to other modes therein.

As disclosed in United States Patents 3,134,837, issued May 26, 1964 to P. P. Kisliuk and D. A. Kleinman, and 3,187,270, issued June 1, 1965 to H. W. Kogelnik and C. K. N. Patel, certain axial arrangements of plane and/or curved reflectors are useful in improving the mode selectivity of optical maser cavities. However, the mirror spacings in such arrangements are for some applications undesirably critical.

It is therefore an important advantage of the present invention that mode suppression is not unduly dependent on reflector placement.

In accordance with the invention, mode discrimination is achieved by dividing the stimulated energy into two portions, each of which is individually resonated in spatially separate optical cavities having one common extremity, or end reflector. With one cavity tuned to the desired center frequency and the other differently proportioned, side mode suppression can be effected; and the energy divider is a beam-splitting reflector oriented to exclude the active medium from the secondary cavity, whereby the secondary cavity can be as much smaller than the primary cavity as desired and thereby yield arbitrarily sharp axial mode selectivily. In particular, the secondary cavity is designed to provide narrower band reflectivity.

The above and other objects of the invention are achieved in one illustrative embodiment thereof comprising two axially spaced reflectors defining the ends of a primary optical cavity resonator, a beam splitting element disposed on the primary cavity axis for deflecting a portion of the oscillating energy out of the primary resonator, and a third reflector located off the primary cavity axis and normal to the energy deflected from the primary cavity. The third reflector forms, with one of the first two reflectors, an auxiliary or secondary cavity resonator which can be separately adjusted. The negative temperature medium is located between the energy divider and the reflector which is solely part of the primary cavity.

In particular, the light deflecting element is disposed to produce a primary cavity having a beam path defined between the common reflector and the opposite reflector which is parallel thereto, and an auxiliary or secondary cavity having a beam path defined between the common reflector and the auxiliary reflector.

Ordinarily one reflector is made partially transmissive to permit abstraction of a portion of the resonant energy. For particular applications, two or more end reflectors may each be partially transmissive. It may also be desired that the output be taken from the beam splitter, in which case all end reflectors can be totally reflective. Such arrangements are all in accordance with the invention.

The above and other objects and features of the invention, together with its additional advantages, will be better understood from the following detailed description taken in conjunction with the accompanying drawing, in which:

FIG. 1 is an optical maser in accordance with the invention; and

FIG. 2 is a graphical representation helpful in understanding certain principles of the invention.

The optical maser 10 shown in FIG. 1 comprises an active medium disposed within a mode selective optical cavity in accordance with the invention. A pair of axially spaced parallel reflectors 11, 12 define the ends of a primary cavity having a length $L_1+L_2$. The surfaces of reflectors 11, 12 can comprise a metallic layer on a dielectric base or a plurality of alternate layers of material of high and low index of refraction of quarter wave thickness at the desired frequency of operation. If energy is to be abstracted through cavity extremities, either or both of the reflectors 11, 12 can be partially transmissive; i.e., typically a few percent transmissive. Otherwise, their reflectivity is typically made to exceed ninety-nine percent.

A third reflector 14, having a normal which is most advantageously orthogonal to the axis 15 of the primary cavity, is positioned opposite a beam splitter or energy dividing means 13, thereby forming a secondary cavity with reflectors 11, 14 as extremities and having a length $L_1+L_3$. The surface of reflector 14 typically is physically similar to that of reflectors 11 and 12. Beam splitter 13 can comprise, for example, a half silvered mirror positioned at 45 degrees to axis 15 to achieve nearly equal division of the incident energy. If desired, other energy dividing ratios with appropriate angular relationships can be utilized.

The negative temperature or active medium, which in the arrangement depicted is a gas or a gas mixture, is disposed between reflector 12 and beam splitter 13. So located, the active medium physically is exclusively in the primary cavity. The active medium is shown contained within an elongated tube 16 having end surfaces 17, 18 oriented substantially at Brewster's angle to the energy beam which passes therethrough along axis 15. The gaseous medium can comprise, for example, a mixture of helium and neon excited by a radio frequency source 19 coupled to conductive straps 20 which encircle tube 16. Gaseous lasers of this type and their principles of operation are now well known in the art. It is to be understood, however, that the invention can be practiced with liquid or solid state active media as well as with gaseous media of differing compositions. Furthermore, the excitation shown in FIG. 1 can be of the direct current type if appropriate.

Lasers of the type hitherto known, employing the Fabry-Perot interferometer as a resonant cavity, are characterized by a number of resonant modes, some of which it is typically desired to suppress. Such modes tend to degrade the performance of the laser and are troublesome whenever the fluorescent emission of the device covers a frequency band wider than about $c/2nd$, where $c$ is the velocity of light, $n$ is the refractive index of the active medium filling the cavity, and $d$ is the distance between the reflective ends thereof.

In FIG. 2 the longitudinal mode frequencies of the primary cavity for the lowest order transverse mode are indicated by the short vertical lines along the abscissa of coordinate system 22. The width of the laser transition in a conventional optical maser is shown by solid curve 23 which is a plot of gain per pass of a light beam through a typical active medium versus frequency. The threshold at which gain exceeds the losses due to scattering, reflection, et cetera is indicated by horizontal solid line 24. It can therefore be seen that all modes having frequencies between $f_a$ and $f_b$ can oscillate unless measures are taken to suppress them. It can also be easily appreciated that, since a single frequency output is usually technically desirable, such suppression measures are needed more often than not.

One simple way of selecting a single mode is to reduce the optical gain across the entire emission band or, equivalently, to raise the threshold for oscillation until only a narrow portion of the line exceeds it. It is also possible to reduce the length $d$ of the cavity, thereby increasing the frequency separation between the modes. Unfortunately, all such measures have the undesirable effect of reducing the available output power.

In accordance with the principles of the invention, however, the energy in a beam propagating to the right along axis 15 toward divider 13 is split thereby, a portion proceeding on through the active medium to primary cavity reflector 12, and the remainder proceeding to auxiliary cavity reflector 14, disposed normal to the auxiliary cavity sub-axis 21. Thus it can be seen that a secondary resonance can be established for energy propagating between reflectors 11 and 14 via beam splitter 13. The secondary resonance characteristic affects the gain curve associated with the primary cavity formed by reflectors 11 and 12, and is used in accordance with the invention to suppress unwanted longitudinal modes. In particular, the secondary cavity is made to have effectively a narrower band reflectivity characteristic than the primary cavity.

With the separations among reflectors 11, 12, 14, and beam splitter 13 defined as $L_1$, $L_2$, and $L_3$, respectively, the energy lost, A, from beam splitter 13 in a direction parallel to axis 26 at a given wavelength $\lambda$ can be written $$A=\frac{4R \sin^2\left[\frac{2\pi}{\lambda}(L_1+L_3)\right]}{T^2+4R \sin^2\left[\frac{2\pi}{\lambda}(L_1+L_3)\right]} \quad (1)$$

where R and T are, respectively, the reflectance and transmittance of the beam splitter. The reflectors 11, 12, and 14 are assumed to have $R=1$. By tuning the auxiliary cavity to have a high reflectivity at $f_0$, as seen from the primary cavity, a small change in $\lambda$ will result in a large change in the loss of side mode energy, since such laser modes, typically spaced in frequency the order of 150 megacycles from the desired center frequency of operation, $f_0$, are characterized by a significantly lower reflection coefficient. The tuning of the auxiliary cavity can be achieved by proper adjustment of either $L_1$ or $L_3$, although it is often more convenient to vary $L_3$ and therefore to leave the primary cavity length unchanged. The total length $L_1+L_3$ of the auxiliary cavity is selected to be different from the total length $L_1+L_2$ of the primary cavity.

As a typical example, for a half silvered 45-degree mirror as beam splitter 13 for which $R=T=0.5$, and for $L_2=0.94$ meter, $L_1=0.06$ meter, and $L_3=0.04$ meter, the power lost per round trip of energy at a side frequency approximately 150 megacycles from $f_0$ is 40 percent. Side frequencies further from $f_0$ are attained still more. Such losses are sufficient to prevent output at the side frequencies and, accordingly, to provide increased available power at the desired center frequency.

In FIG. 2, the effect of the addition of the auxiliary cavity is indicated by the loss curve represented by dashed curve 25, which is a portion of the periodic reflection characteristic of the auxiliary cavity. It is convenient to consider the auxiliary cavity as a composite reflector normal to the main laser beam propagating along axis 15. Such a reflector is characterized by a periodic narrow band reflectivity which, when centered at the desired frequency $f_0$ of the primary cavity, acts as a highly reflective end mirror with associated low loss. All other frequencies within the period of the auxiliary cavity experience lower reflectivity and accordingly higher loss, as depicted in FIG. 2. The width, S, of curve 25 is determined by the reflectivity of the beam splitter, in accordance with Equation 1. For higher reflectivities, the width S is greater and the loss peaks in FIG. 2 are narrower. Thus in an optical maser arrangement in which the side frequencies are closely spaced, it may be necessary to raise the reflectivity of the divider 13 to exceed the 50 percent of the specific example presented hereinbefore in order to prevent the adjacent side frequencies from falling within the low loss region of curve 25. When the auxiliary cavity is properly tuned, losses at mode frequencies removed from the desired frequency $f_0$ are increased, thereby reducing the net gain below the threshold at which oscillation can be sustained. The result is more intense emission at the single desired frequency.

It is understood that, although the invention has been described with particular reference to a specific embodiment, numerous and varied other embodiments can be devised by those skilled in the art without departing from the spirit and scope of the invention.

For example, the reflectors comprising the primary and secondary cavities can comprise concave rather than plane surfaces, or a combination of concave and plane mirrors can be used. When concave reflectors are used, the concave surfaces are selected to match the curvature of the wavefront of the incident energy. As a specific example, reflector 11, of reflectance 1.0, can be plane, reflector 12, of reflectance 0.997, would have a radius of curvature of 2 meters, and reflector 14, also of reflectance 1.0, would have a radius of curvature of 10 meters. In this embodiment, a 50 percent beam splitter is employed, and $L_1+L_2$ is 150 centimeters, and $L_1+L_3$ is 7.5 centimeters.

The subject matter of the copending application of C. F. Edwards and E. A. J. Marcatili, Ser. No. 466,366, filed June 23, 1965 concurrently herewith and assigned to the assignee of this application, is related in certain respects to the disclosure herein.

What is claimed is:
1. A side mode suppressing optical maser comprising first and second reflective means arranged to form an optical resonator having an axis normal to said means,
    an active medium disposed within said resonator,
    said first reflective means comprising a single energy reflector,
    said second reflective means comprising a three mirror secondary resonator excluding said active medium, whereby said second reflecting means can be arbitrarily small and can have reflectivity of correspondingly narrowband.
2. An optical maser of the type comprising a primary optical resonator having a primary axis, an active medium disposed in said primary resonator for the emission of coherent radiation, and a secondary optical resonator coupled to said primary resonator and adapted to suppress side modes of said primary resonator, said maser being characterized in that said secondary resonator includes a beam-splitting reflector having an oblique orientation with respect to said primary axis and includes end reflectors disposed with respect to said beam-splitting reflector to exclude said active medium from said secondary resonator.
3. An optical maser of the type claimed in claim 2 in which the beam-splitting reflector has an oblique orientation with respect to the primary axis to provide substantial loss of side mode energy from the maser.

References Cited

Fontana, J. R.: "Modes in Coupled Optical Resonators With Active Media," IEEE Transactions on Microwave Theory and Techniques, MTT–12,400 July 1969.

Buser et al.: "Interferometric Measurements of Rapid Phase Changes in the Visible and Near Infrared Using a Laser Light Source," Appl. Optics, vol. 3, No. 12, December 1964, pp. 1495–1499.

RONALD L. WIBERT, Primary Examiner

U.S. Cl. X.R.

356—106, 112

Notice of Adverse Decisions in Interferences

In Interference No. 97,581 involving Patent No. 3,504,299, A. G. Fox, OPTICAL MASER MODE SELECTOR, final judgment adverse to the patentee was rendered May 29, 1973, as to claim 1.

[*Official Gazette October 23, 1973.*]